United States Patent
Schellens

(10) Patent No.: US 11,220,208 B1
(45) Date of Patent: Jan. 11, 2022

(54) EMERGENCY LIGHT ACCESSORY MOUNT FOR A VEHICLE

(71) Applicant: Thomas E. Schellens, Old Lyme, CT (US)

(72) Inventor: Thomas E. Schellens, Old Lyme, CT (US)

(*) Notice: Subject to any disclaimer, the term of this patent is extended or adjusted under 35 U.S.C. 154(b) by 103 days.

(21) Appl. No.: 16/675,466

(22) Filed: Nov. 6, 2019

Related U.S. Application Data

(60) Provisional application No. 62/848,124, filed on May 15, 2019, provisional application No. 62/760,125, filed on Nov. 13, 2018.

(51) Int. Cl.
| | | |
|---|---|---|
| *B60Q 1/26* | (2006.01) | |
| *F21S 8/00* | (2006.01) | |
| *F21S 10/06* | (2006.01) | |
| *B60Q 1/52* | (2006.01) | |
| *B60Q 1/00* | (2006.01) | |
| *B60Q 1/24* | (2006.01) | |
| *F21W 102/00* | (2018.01) | |

(52) U.S. Cl.
CPC .......... *B60Q 1/2611* (2013.01); *B60Q 1/0052* (2013.01); *B60Q 1/245* (2013.01); *B60Q 1/52* (2013.01); *F21S 8/03* (2013.01); *F21S 10/063* (2013.01); *F21W 2102/00* (2018.01)

(58) Field of Classification Search
CPC ........ B60Q 1/2611; B60Q 1/245; B60Q 1/52; B60Q 1/0041; B60Q 1/0052; B60Q 9/00; F21S 10/063; F21S 8/02; F21S 8/03; F21W 2102/00; F21W 2102/10
See application file for complete search history.

(56) References Cited

U.S. PATENT DOCUMENTS

| | | | | |
|---|---|---|---|---|
| 3,789,358 | A * | 1/1974 | Ellis | B60Q 1/2611 340/473 |
| 7,821,380 | B1 * | 10/2010 | Grote, Jr. | B60Q 1/52 340/384.4 |
| 8,342,725 | B2 * | 1/2013 | Stein | F21V 5/04 362/493 |
| 8,511,526 | B2 | 8/2013 | Schellens | B60R 9/04 |
| 10,124,719 | B1 * | 11/2018 | Bailey | F21S 41/192 |
| 2007/0258239 | A1 * | 11/2007 | Stein | B60Q 1/2611 362/227 |
| 2009/0207612 | A1 * | 8/2009 | Datz | B60Q 1/2611 362/249.14 |
| 2013/0300556 | A1 * | 11/2013 | Wang | B60Q 1/2611 340/471 |
| 2018/0118097 | A1 * | 5/2018 | Thompson | F21S 45/10 |

FOREIGN PATENT DOCUMENTS

| | | | | |
|---|---|---|---|---|
| DE | 202008007414 U1 * | 7/2008 | .......... | B60Q 1/2611 |
| GB | 2514841 A * | 12/2014 | .......... | F21S 43/19 |
| KR | 100389593 B1 * | 6/2003 | | |
| WO | WO-2018037248 A2 * | 3/2018 | .......... | B60Q 1/2611 |

* cited by examiner

*Primary Examiner* — Erin Kryukova
(74) *Attorney, Agent, or Firm* — Fattibene and Fattibene LLC; Paul A. Fattibene

(57) ABSTRACT

An accessory mount mountable to a roof of a vehicle. The accessory mount has a horizontal mounting surface spaced from and above emergency warning lights. Accessories, such as spotlights, may be mounted on the horizontal mounting surfaces. The accessory mount provides a platform above the emergency warning lights allowing unobstructed view of the emergency warning lights without any possible of obstruction by the accessory mounted on the horizontal mounting surface.

11 Claims, 8 Drawing Sheets

EMERGENCY LIGHT ACCESSORY MOUNT FOR A VEHICLE

RELATED APPLICATIONS

This application claims the benefit of U.S. Provisional Application No. 62/760,125 filed Nov. 13, 2018 and U.S. Provisional Application No. 62/848,124 filed May 15, 2019, both of which are herein incorporated by reference.

FIELD OF THE INVENTION

The present invention relates in general to an accessory mount for a vehicle and particularly to and accessory mount for a vehicle for mounting a spotlight without interrupting the field of view of an emergency warning light apparatus.

BACKGROUND OF THE INVENTION

It is often desirable to mount accessories to a motor vehicle, such as a truck or sport utility vehicle, SUV. While there are many methods to attach accessories onto vehicles, many create a conflict when installing a warning light and additionally a spot light. Warning lights require full 360 degree visibility to conform to National Highway Safety Board requirements for service vehicles. In many circumstances, a service vehicle which would require a warning light would also require a site or spot light for illumination of a work area, specific hazard, or general night time inspections. For optimum usage, these spot lights require a location on the roof of the service vehicle which conflicts with the full distribution of the neighboring warning light illumination.

SUMMARY OF THE INVENTION

The present invention is an accessory mount that has multiple vertical surfaces for mounting warning lights and a raised horizontal surface for mounting a spotlight or other devise. The emergency light accessory mount comprises a spotlight assembly and an attached emergency warning light assembly. The emergency warning light assembly is attached to a service or other emergency vehicle and provides a horizontal platform on which the spotlight assembly may be attached without obstructing visibility of the emergency warning lights. The emergency warning lights are visible for 360° and may be electronically sequenced to simulate a rotating light.

The body of the accessory mount is made up of a metal frame having multiple bends or folds, and perforations. Optionally, a plastic housing or cover may be added for aesthetics and aerodynamics.

Accordingly, it is an object of the present invention to provide vertical surface areas for the mounting on the surface or penetrating, of an emergency light so as to provide a full 360 degree warning light projection while providing a structurally secure horizontal surface for the mounting of a spotlight or other device above and out of the field of projection of the warning lights.

It is an advantage of the present invention that it is easy to install and secure onto a vehicle with fasteners, a magnetized base, or other attachment means.

It is another advantage of the present invention that it is made with a minimum of parts and is easy to assemble.

It is another advantage of the present invention that vertical surfaces may accommodate a wide variety of warning lights, both surface mounted and push thru, from a wide variety of manufactures.

It is a feature of the present invention that a horizontal surface is designed to support the load of a spotlight and transfer that load to the vehicle or mounting surface.

It is another feature of the present invention that all wiring and connections are made within the accessory mount and are protected from weather and elements by means of a base gasket system.

It is yet another feature of the present invention that the emergency warning lights may be electronically sequenced on and off to simulate a rotating emergency warning light.

It is yet another feature of the present invention that the spotlight assembly may be rotated 360° without obstructing visibility of the emergency warning lights.

In a second embodiment of the present invention a slightly different configuration is utilized to form the emergency light accessory mount. An emergency warning light assembly uses a support frame attached to an emergency warning light frame. The support frame helps to bear the weight of a spotlight assembly. The light frame holds emergency warning lights securely in position. A transparent or translucent molded housing covers the emergency warning light assembly. A spot light assembly may be placed on the molded housing.

It is an object of the second embodiment to provide an emergency light accessory mount that is easily assembled.

It is an advantage of the second embodiment that emergency warning lights are easily positioned and securely held.

It is a feature of the present invention that a support frame and a light frame are configured to be adaptable to various different emergency warning lights.

These and other, objects, advantages, and features will become more readily apparent in view the following detail description.

DETAILED DESCRIPTION OF THE PREFERRED EMBODIMENTS

Figure 1:
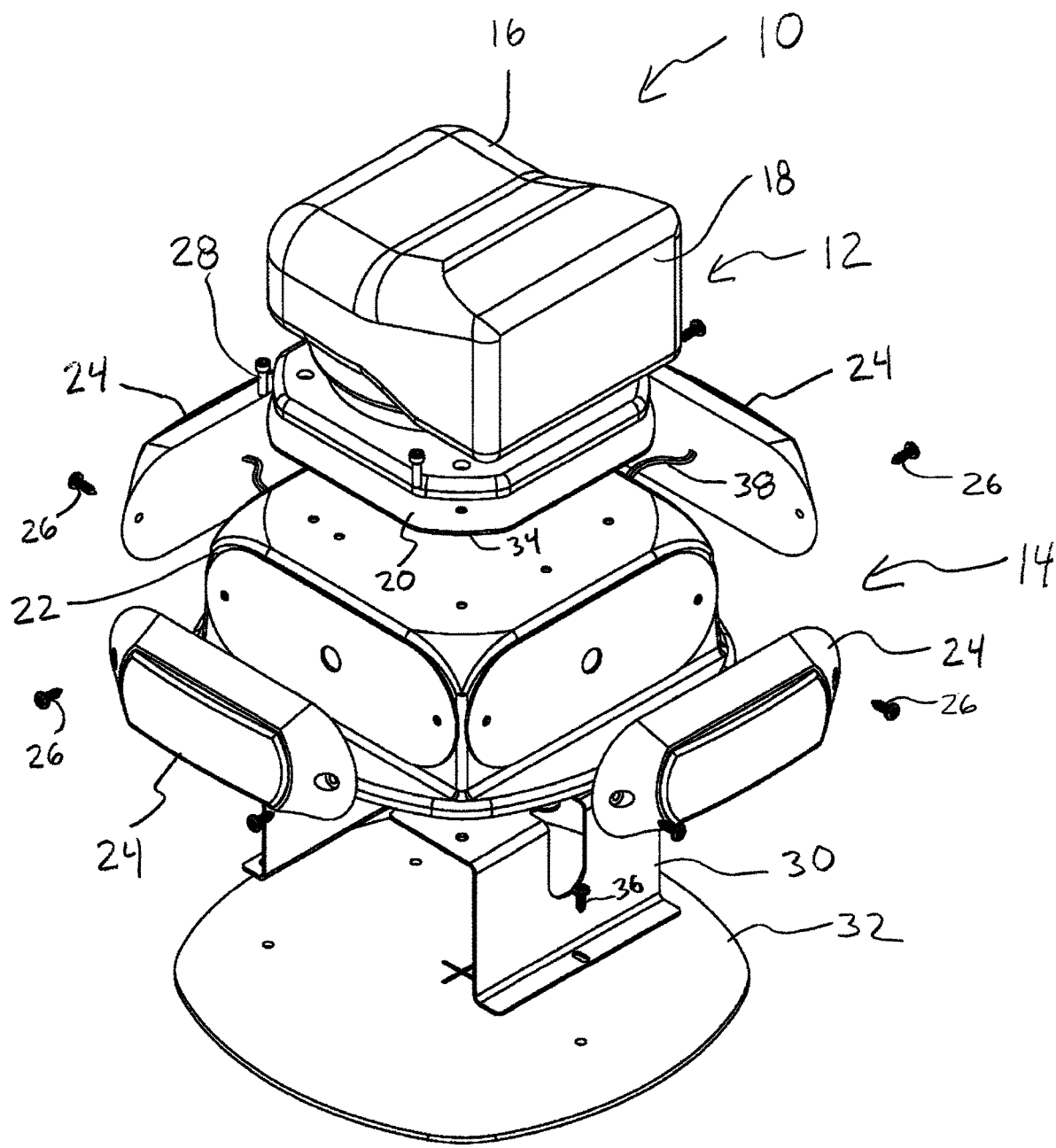
FIG. 1 is an exploded perspective view schematically illustrating the present invention.
Figure 2:
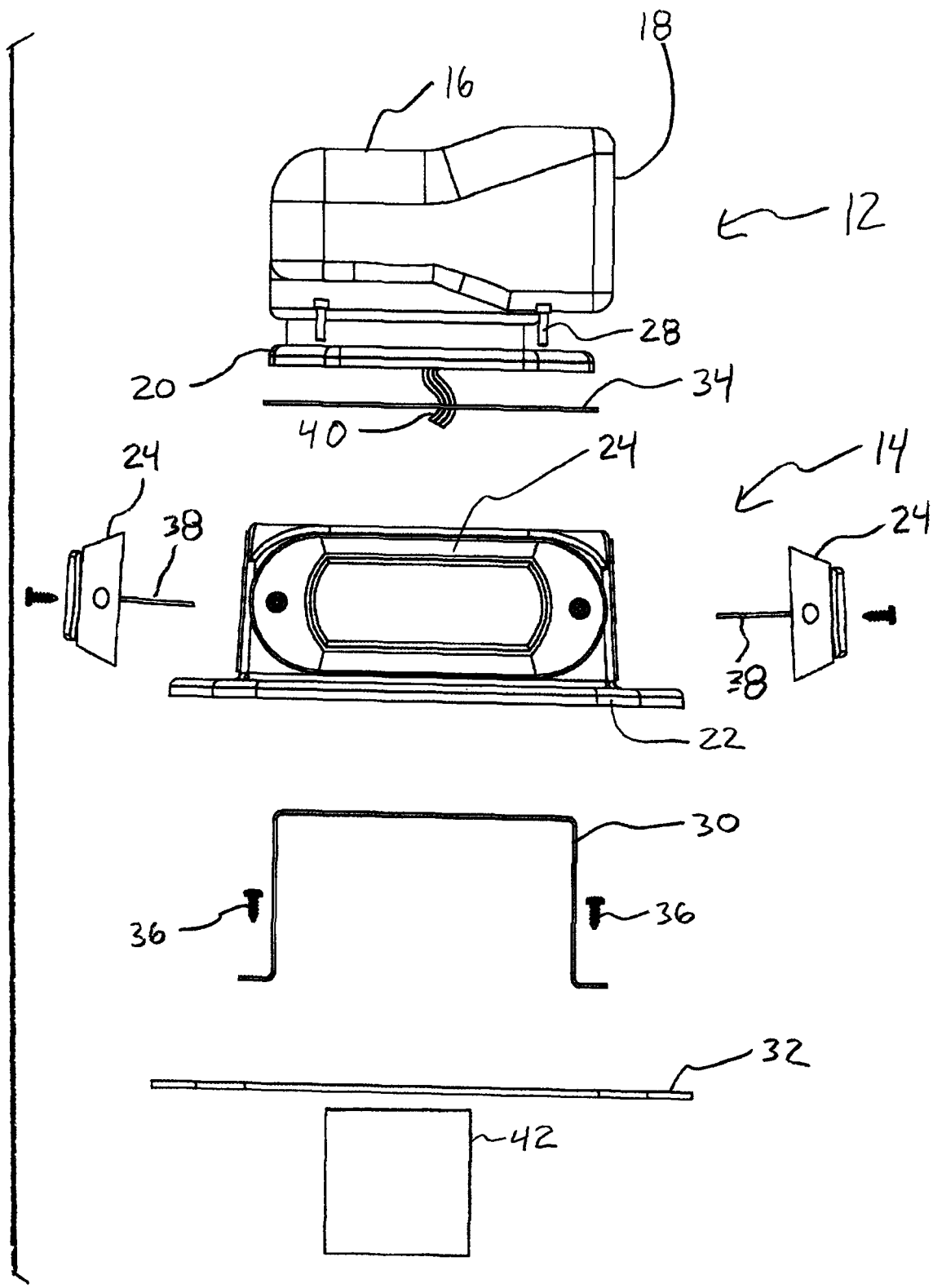
FIG. 2 is an exploded elevational view schematically illustrating the present invention.

FIGS. 1 and 2 illustrates an embodiment of the present invention. An emergency light accessory mount 10 comprises a spot light assembly 12 and an emergency warning light assembly 14. The spotlight assembly 12 comprises a spotlight housing 16 and a spotlight 18. The spotlight 18 provides a beam of light. The spotlight housing 16 is mounted to a spotlight rotating base 20. The spotlight rotating base 20 permits the spotlight housing 16 to rotate 360°. A spotlight gasket 34 may be used to separate or seal the spotlight assembly 12 from the emergency warning light assembly 14. Fasteners or screws 28 attached the spotlight assembly 12 to the molded housing 22 of the emergency warning light assembly 14. The spotlight assemble 12 is connected to a controller 42 by wiring harness 40.

The emergency warning light assembly 14 comprises a molded housing 22 placed over a metal body 30. The molded housing 22 may be made of plastic, and preferably a thermoplastic, and more preferably acrylonitrile butadiene styrene or ABS. The metal body 30 is bent into a predetermined shape providing support to the molded housing 22 as well as attachment points to a mounting plate 32 or other surface. The molded housing 22 may be attached to the metal body 30 by fasteners or screws to facilitate assembly.

On the sides of the molded housing 22 are placed a plurality of emergency warning lights 24. The emergency warning lights 24 are visible for the entire 360° perimeter of the molded housing 22. The emergency warning lights 24 are coupled by a wiring harness 38 to a controller 42, which may be placed inside a service or emergency vehicle. The emergency warning lights 24 are attached to the molded housing 22 with fasteners or screws 26. Additional fasteners may be used to securely attach the molded housing 22 to the metal body 30. Fasteners or screws 36 are used to attach the metal body 32 to the mounting plate 32.

The novel structure of the present invention permits independent operation of the spotlight assembly 12 from the emergency warning lights 24. The spotlight assembly 12 may be rotated 360° without obstructing the visibility of the emergency warning lights 24. Similarly, the emergency warning lights 24 are visible around 360° without any obstruction from the spotlight assembly 12.

Figure 3:
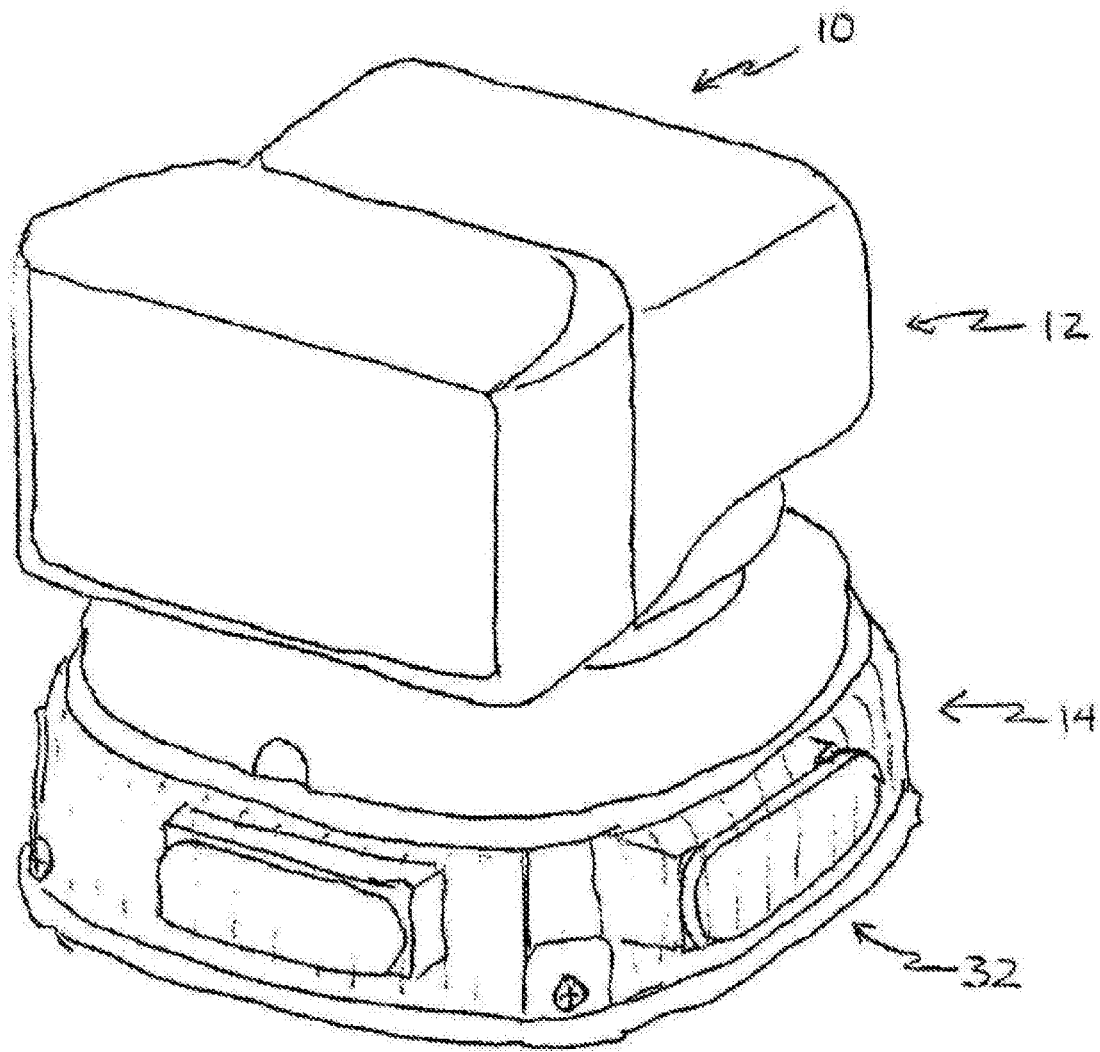
FIG. 3 is a perspective view of the present invention assembled.
Figure 4:
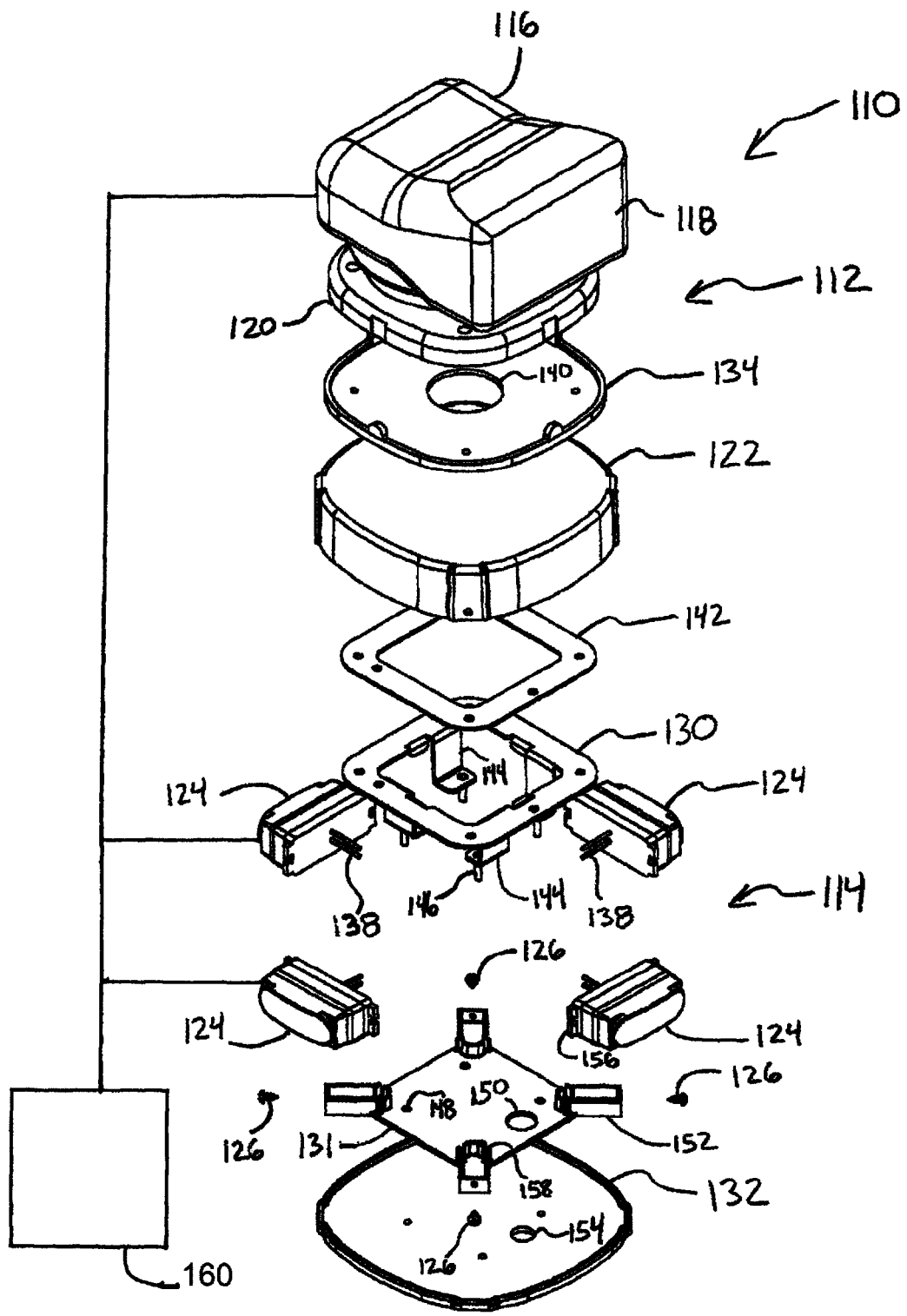
FIG. 4 is an exploded perspective view of a second embodiment of the invention.
Figure 5:
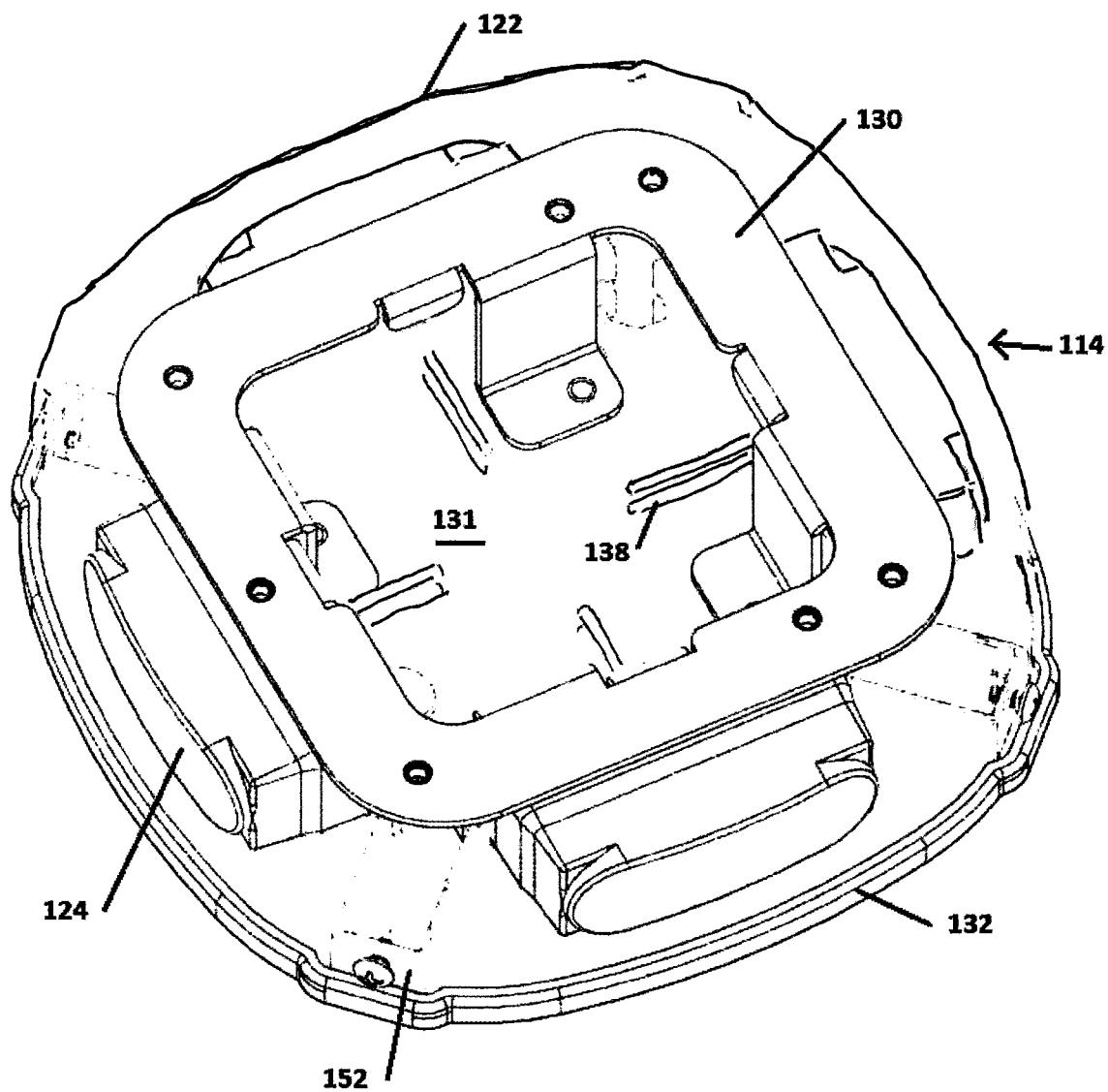
FIG. 5 is a perspective view of the second embodiment of the invention.
Figure 6:
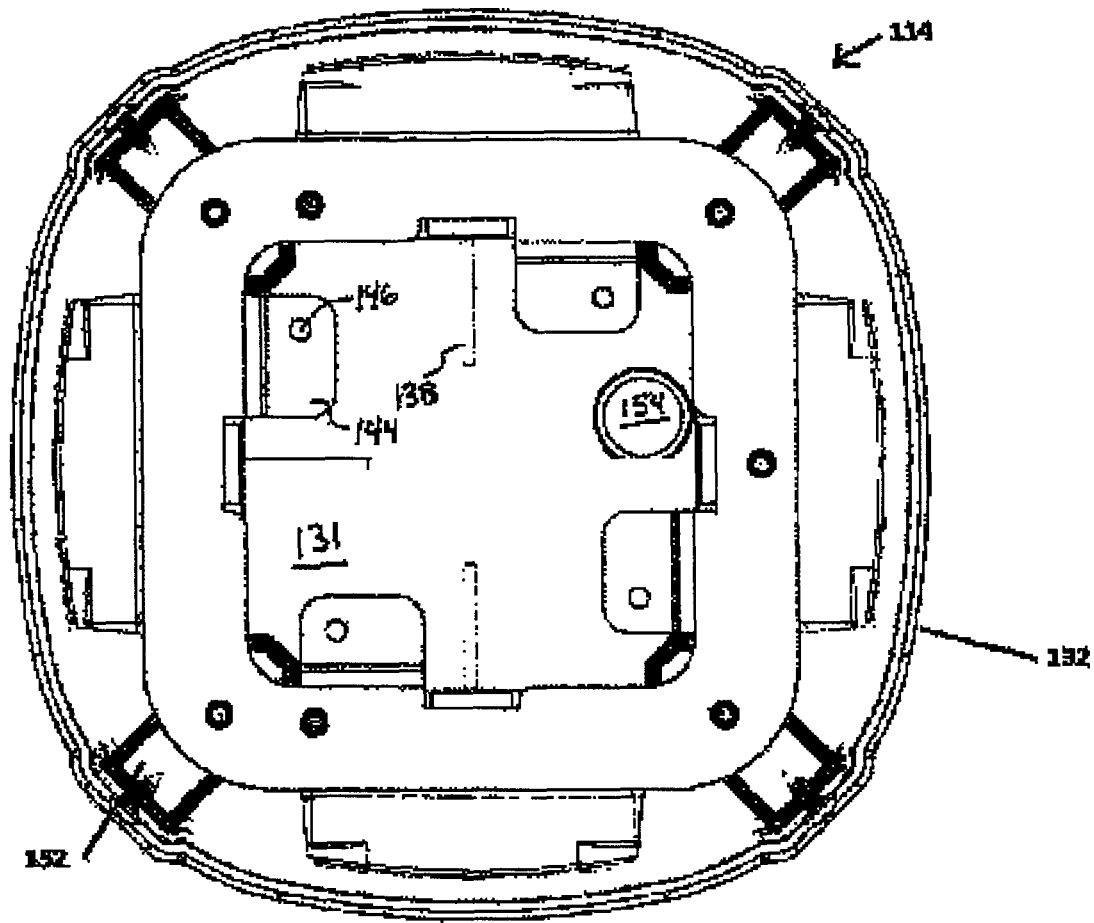
FIG. 6 is a top plan view of the second embodiment of the invention.
Figure 7:
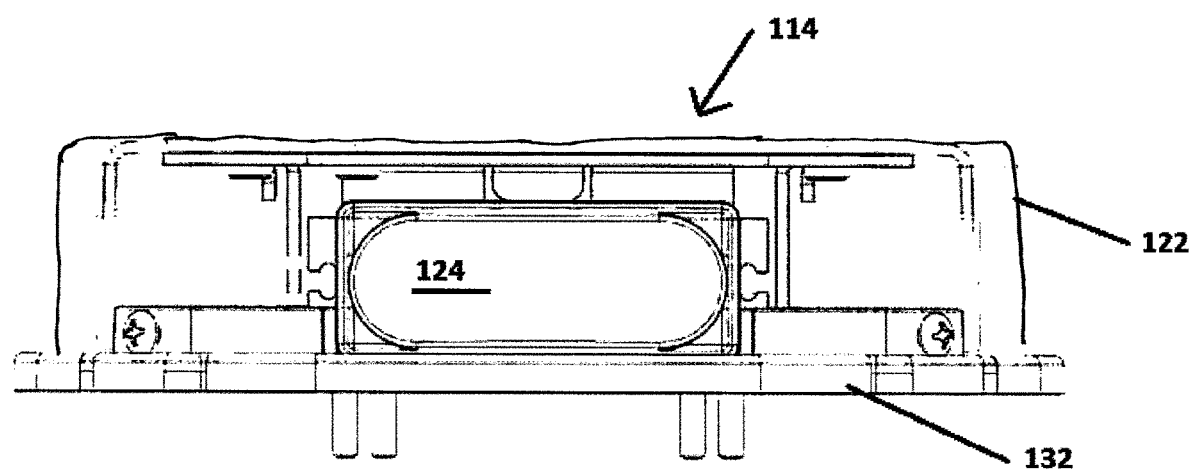
FIG. 7 is an elevational view of the second embodiment of the invention.
Figure 8:
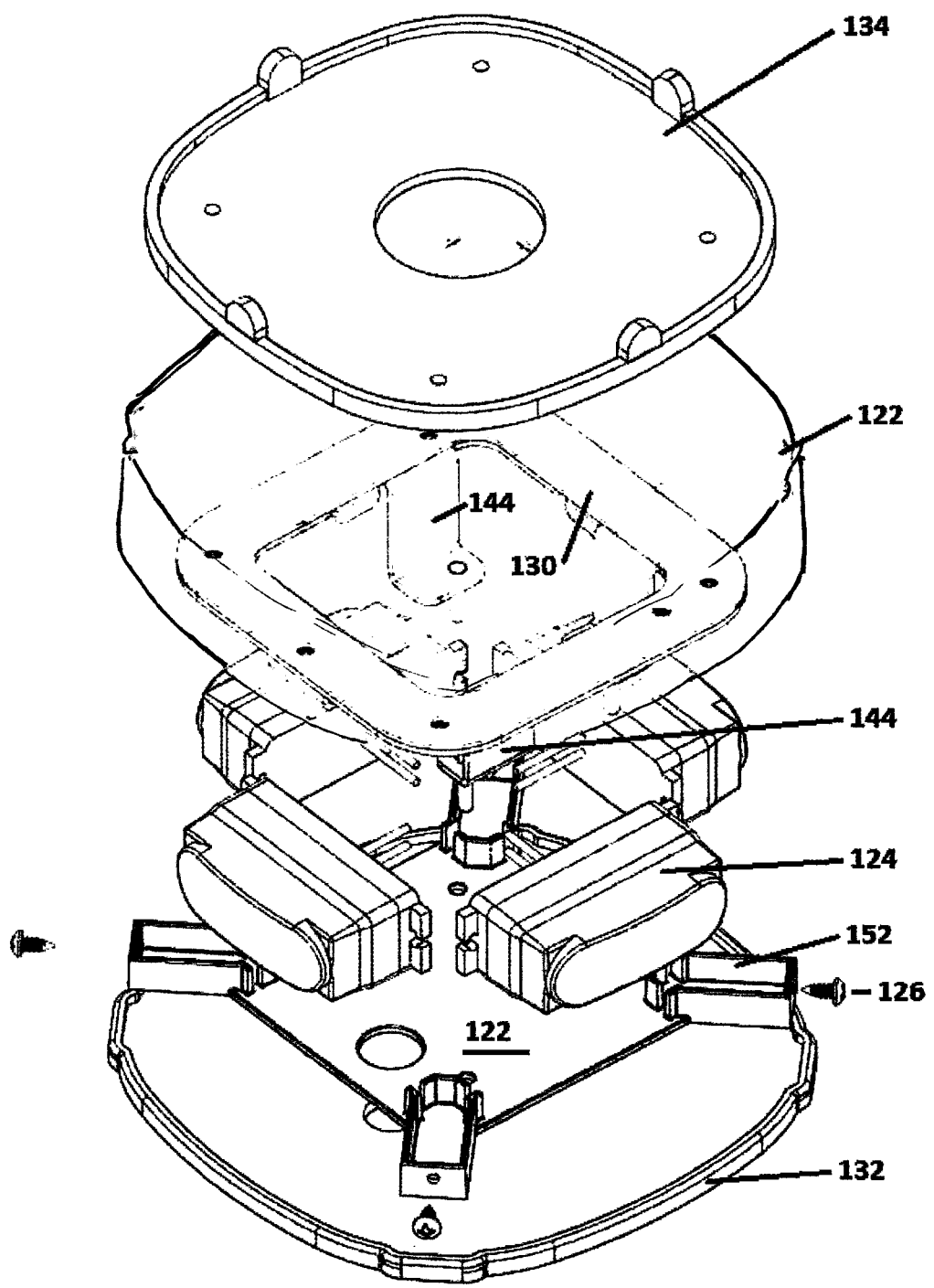
FIG. 8 is an exploded perspective view the second embodiment of the invention.

FIG. 3 pictorially represents a perspective view of the assembled emergency light accessory mount of the present invention. The emergency light accessory mount 10 comprises the spot light assembly 12 and the emergency warning light assembly 14 attached to a mounting plate 32.

The operation of the emergency light accessory mount 10 is controlled by the controller 42. The controller 42 independently controls movement of the spotlight assembly 12 and of the simulated motion of the emergency warning lights 24. The controller 42 may turn the emergency warning lights 24 on and off in any desired sequence so as to simulate the rotating motion of an emergency warning light. For example, the controlled sequence of emergency warning light may be timed such that emergency warning lights appear to be rotating around 360°.

The present invention provides an emergency light accessory mount that combines a spotlight with emergency warning lights that can be independently used without either obstructing the other. The emergency light accessory mount of the present invention can also be easily mounted, and is particularly well-suited to be mounted on a removable platform. Additionally, the emergency warning light assembly 14 functions to increase the height of the spotlight assembly 12 from between three to five inches from the surface on which the emergency light accessory mount is attached improving the function of the spotlight by improving the distance light illumination from the spotlight may be cast.

Preferably, the emergency light accessory mount 10 may be attached to a platform which is secured to a service or emergency vehicle with existing openings. For example, a platform as disclosed in U.S. Pat. No. 9,162,628 entitled "Vehicle Mounting Platform Using Existing Opening" issuing to Thomas E. Schellens on Oct. 20, 2015, which is herein incorporated by reference, may be used for mounting the present invention.

FIGS. 4-8 illustrate a second embodiment of the present invention. This second embodiment has a modified structure that facilitates assembly as well as adaptability to different emergency warning lights.

The emergency light accessory mount 110 comprises a warning light assembly 114 on which a spotlight assembly 112 may be mounted. The spotlight assembly 112 comprises spotlight housing 116 and a spotlight 118. Attached to the spotlight housing 116 is a spotlight rotating base 120. A transparent or semitransparent molded housing 122 forms a mounting platform for the spotlight assembly 112. A spotlight gasket 134 is placed between the spotlight rotating base 120 and the molded housing 122.

The warning light assembly 114 is formed by a support frame 130 and an emergency warning light frame 131. The support frame 130 has a plurality of legs 144. On the distal end of each of the plurality of legs 114 a guide pin 146 is attached. The emergency warning light frame 131 has a plurality of light cradles 152. Each of the light cradles 152 has light guide slots 158 formed therein to receive light keys 156 formed on each end of the emergency warning lights 124. During assembly the emergency warning lights 124 have their respective light keys 156 placed within a respective one of the light guide slots 158 formed in the cradles 152. The light key 156 and the light guide slots 158 accurately position and securely hold in place each of the emergency warning lights 124 on the emergency warning light frame 131. The guide pins 146 on each of the legs 144 of the support frame 130 are placed in a respective one of the guide pin holes 148 on the light frame 131. A housing gasket 142 may be placed between the support frame 130 and the housing 122. Fasteners or screws 126 pass through holes in the molded housing 122 and into an end of the cradle 152 securely attaching the housing 122 to the cradle 152 and emergency warning light assembly 114.

Hole 140 in the spotlight gasket 134, hole 150 in the light frame 131, and hole 154 in the mounting plate 132 may be used to pass a wire for an electrical connection from the spotlight assembly 112 and the emergency warning light wiring 138 to an electoral system of a vehicle on which the emergency light accessory mount 110 is attached. A controller 160 is coupled to the spotlight assembly 112 and emergency warning lights 124 controlling movement of the spotlight assembly 112, illumination of the spotlight 118, and on-and-off sequencing of the emergency warning lights.

The present invention provides a molded housing 122 forming a support surface for the attachment of a spotlight assembly 112. The support frame 130 having legs 146 connected to a light frame 131 provides a structure suitable for bearing the weight of a spotlight assembly 112 attached to the support surface of the molded housing 122. This positions the spotlight assembly 112 in a position so that it can rotate without obstructing or intersecting a plane formed by the plurality of emergency warning lights held within the light frame 131. This assures that the emergency warning lights 124 will always be clearly seen from any angle no matter what position the spotlight assembly 112 is in.

Additionally, the emergency light accessory mount 110 of the present invention only requires a single mount to be attached to a vehicle that provides both the function of a spotlight and an emergency warning light. The cradles 152 in combination with the legs 144 can be configured or adapted to accommodate different size or dimension emergency warning lights 124 without substantial modification to the emergency light accessory mount 110 simplifying assembly and manufacture. The particular construction of the emergency light accessory mount 110 of the present invention maintains adaptability to different emergency warning lights 124 while simplifying manufacture and assembly. This structure results in an improved and lower cost emergency light accessory mount 110.

The present invention raises an accessory mount above an emergency warning light assembly permitting a spot light assembly to be mounted on the accessory mount without any possibility of obstructing visibility of the emergency warning lights. This improves safety.

What is claimed is:

1. An emergency light accessory mount for attaching to a vehicle comprising:
   a mounting plate;
   a housing having a top surface and a side perimeter;
   a plurality of emergency warning lights placed around the side perimeter of said housing;
   a support frame with a support frame top surface and opposing legs, the opposing legs supported by said mounting plate and the support frame top surface supporting said housing;
   a spotlight assembly having a rotating base and a spotlight placed on the top surface of said housing; and
   whereby the spotlight assembly is capable of being moved without obstructing visibility of said plurality of emergency warning lights.

2. An emergency light accessory mount as in claim 1 further comprising:
   a controller coupled to said spotlight assembly and said plurality of emergency warning lights, said controller controlling movement of said spotlight assembly, illumination of the spotlight, and on-and-off sequencing of the emergency warning lights.

3. An emergency light accessory mount as in claim 2 wherein:
   the on-and-off sequencing of the emergency warning lights simulate a light rotating 360°.

4. An emergency light accessory mount as in claim 1 wherein:
   said housing comprises a metal body covered by a molded housing.

5. An emergency light accessory mount as in claim 4 wherein:
   the molded housing is made of plastic.

6. An emergency light accessory mount configured to attach to a vehicle comprising:
   a mounting plate configured to attach to a vehicle;
   an emergency warning light assembly having an emergency warning light frame holding a plurality of emergency warning lights and a support frame with a surface and legs, wherein the plurality of emergency warning lights are held between the surface and said mounting plate; and
   a molded housing attached to the surface of the support frame of said emergency warning light assembly,
   wherein the molded housing forms a mounting surface configured to hold a spotlight assembly.

7. The emergency light accessory mount configured to attach to a vehicle as in claim 6 wherein:
   the surface and the legs of the support frame are configured to support the spotlight assemble.

8. The emergency light accessory mount configured to attach to a vehicle as in claim 6 further comprising:
   a plurality of cradles each configured to hold one of the plurality of emergency warning lights.

9. The emergency light accessory mount configured to attach to a vehicle as in claim 6 further comprising:
   a spotlight attached to the molded housing.

10. The emergency light accessory mount configured to attach to a vehicle as in claim 9 wherein:
    said spotlight is rotatable.

11. The emergency light accessory mount configured to attach to a vehicle as in claim 10 wherein:
    said spotlight is configured to rotate spaced from the plurality of emergency warning lights.

* * * * *